United States Patent Office 3,504,883
Patented Apr. 7, 1970

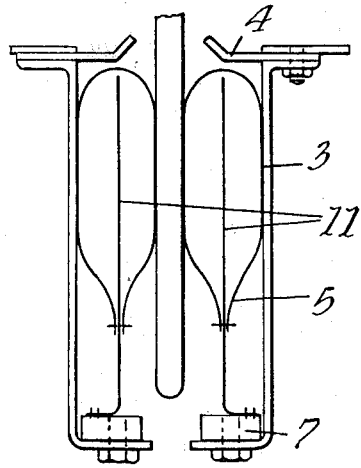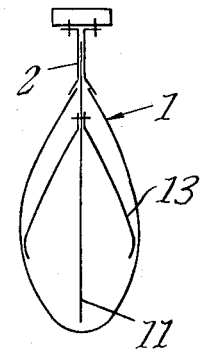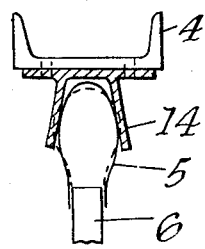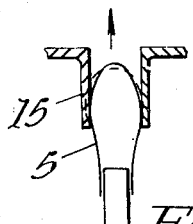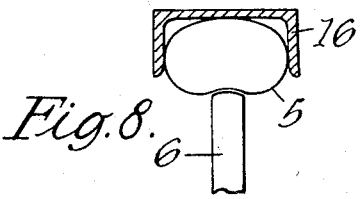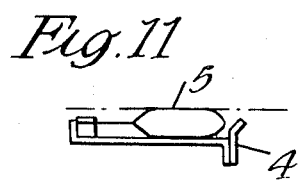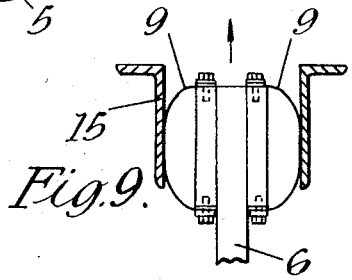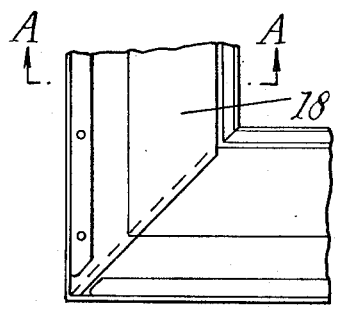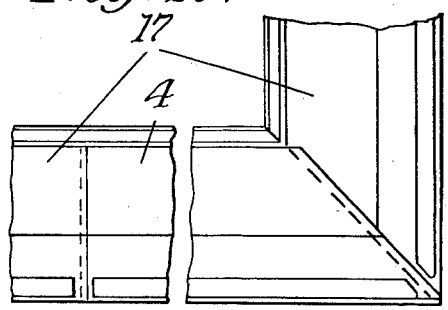

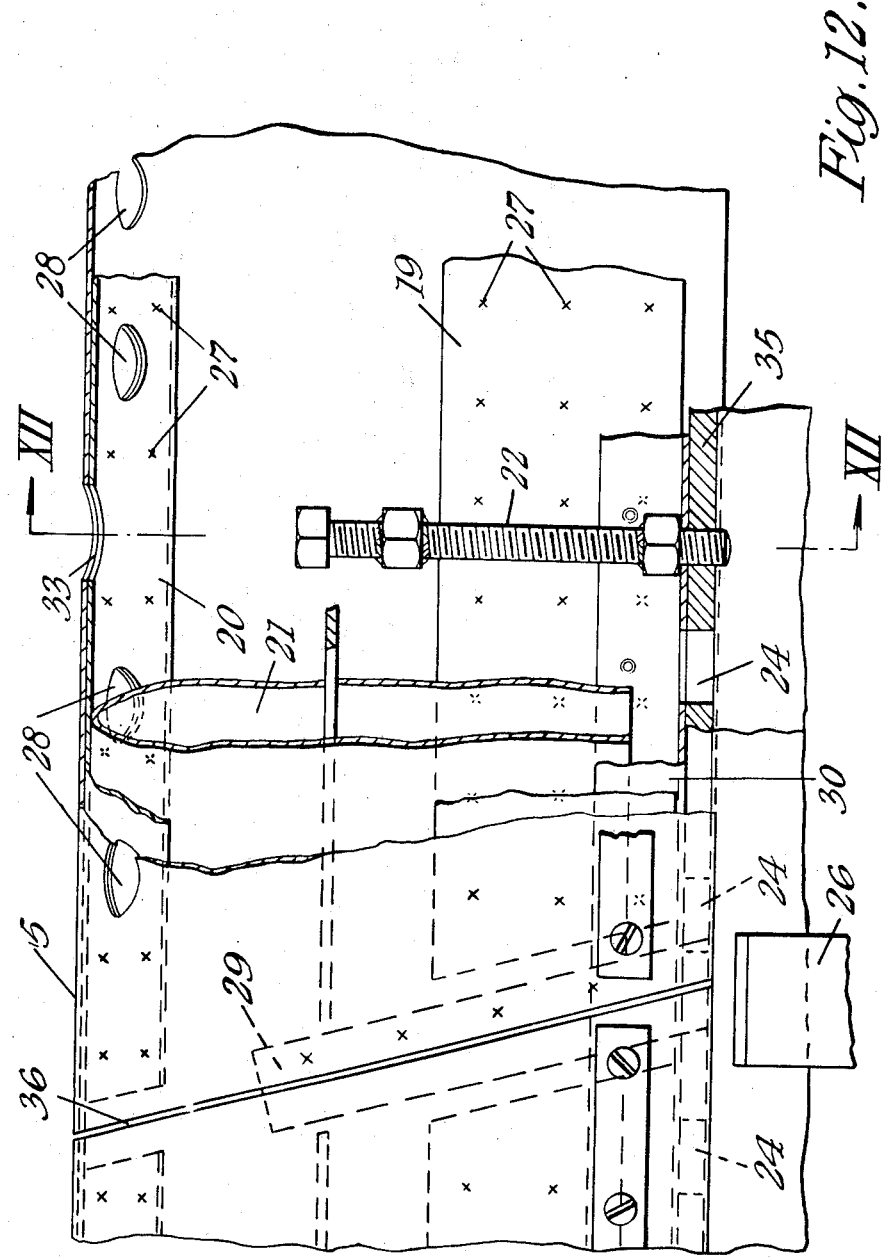

3,504,883
SEALING MEANS FOR DAMPERS AND THE LIKE
Kurt Beck, Glarus, Switzerland, assignor, by mesne assignments, to Grossventiltechnik A.G., Glarus, Switzerland
Filed June 19, 1967, Ser. No. 647,093
Int. Cl. F16k 3/10
U.S. Cl. 251—172　　　　　　　　　　　　　12 Claims

ABSTRACT OF THE DISCLOSURE

Sealing means for dampers and the like in which the seal is effected by at least one loop formed of flexible spring-tempered sheet material secured at both ends. The loop is adapted to be elastically deformed in its cross-sectional shape by being pressed against a seating face to effect a seal between a moving member and a fixed frame with which the moving member co-operates.

---

This invention relates to sealing means for dampers, valves, isolators and the like.

The sealing of gaps and clearances in louvre and sliding dampers by means of thin flexible spring elements is an established practice. The application of this principle to sliding types of isolators encounters, however, certain difficulties which severely restrict their use.

In this application they meet with two types of difficulties. The one is the lack of strength if stressed in compression. This is due to the fact that the thinner the leafspring the greater its elasticity and thus usefulness for sealing, and vice versa.

Therefore, if subjected to a sliding motion relative to its seating in tensioning, the slightest protrusion on the seating, say a welding spot, or a bit of deposit, against which the thin edge of the spring comes will cause a crumbling up of the spring sheet and its destruction.

The second difficulty is in the fact that such slides, in many cases will have to penetrate thick flue dust layers. In such case, the heavy weight of the flue dust will distort the thin spring leaf beyond its elastic limit and thus make it useless as a seal.

The present invention consists in sealing means for dampers and the like in which the seal is effected by at least one loop formed of flexible spring-tempered sheet material (metal) secured at both ends, the loop being adapted to be elastically deformed in its cross-sectional shape by being pressed against a seating face to effect a seal between a moving member and a fixed frame with which the moving member co-operates.

In one alternative of the invention a single loop in closing, is pushed into a channel, or throat, the opening of this channel or throat being smaller than the diameter of the loop to be accommodated, the closing movement thus effecting the compression of the loop.

In another alternative application of the invention as a gland, two loop springs are mounted between rigid retaining faces so that they somewhat compress each other. These loops may be in contact with each other, e.g. to effect a seal of the duct against the outer atmosphere even in the "open" position of the valve, i.e. when the moving member is withdrawn. In the closing movement the moving member will then be pushed between both loops of the gland and thus still further deform their cross section and increase the sealing effect.

If desired, the loop may be filled with air or gas having a pressure differential to atmosphere or to the gas to be contained so that this pressure differential may augment the sealing effect.

The loops may be flexible all around the circumference of the cross section of the loop or may be closed by a rigid member over part of the circumference of the cross section.

We have fund that this type of loop springs, made of comparatively thin, spring-tempered material and having a suitable large diameter will accommodate elastically, and without damage to themselves, very considerable deformation. They will seal with their faces as far as they are flattened in compression. The flat sealing margin will also accommodate a certain lateral deformation caused, for instance by warpage of the moving or fixed member.

These advantages are of particular value in combination with sliding type isolators where cantilever type springs would have the disadvantages stated above.

Where the valve or damper to which the invention is applied is subject to substantial pressure differentials, it may be advisable to protect the thin materials of the loop against undue compressional stresses. This protection could be effected, for instance, by an internal rigid support member or by internal flexible reinforcement composed of comparatively narrow strips or by reinforcing material covering whole areas of the loop interior. The reinforcement should, however, leave a margin of the thin flexible loop spring which makes the actual flat sealing contact with its seating when compressed unreinforced for maximum sealing contact. Both methods, reinforcement and the rigid interior support, could be combined.

The loop springs may be sectionalised into shorter parts to facilitate their servicing or replacement, so that shorter straight loops with butting strips or overlapping will form a longer loop spring seal.

The long seal sections may be fitted with gaps between them. These gaps may facilitate replacement of seal sections, or may form feeding holes for the conduct of air or gases for purposes of sealing or as air barrier. In such cases, butting strip springs may be added to close such gaps up to a sealing line.

Furthermore, straight loops may be mounted adjoining each other in any desired angle, so that square, or other polygonal loop seals may be effected, for instance, where a loop seal is desired over the whole or part of the valve perimeter.

It will be of advantage if loop springs associated with the fixed member are arranged outside the duct, so that they are accessible from outside for inspection or servicing if required.

The usefulness of the invention will be further improved if the loop sections are arranged as integrated sealing components comprising, apart from the loop seal, their own base structure, the supporting member and fixture. In this case, their arrangement must allow for the passage of the overlapping butt strips when sections are lifted off for replacement.

The invention will be further described with reference to the accompanying drawings.

FIGURE 4 is a similar view of a modified form of the embodiment of 2;

FIGURE 5 is a section of a modified form of loop;

FIGURE 6 is a sectional detail of an embodiment in the closed position using a single loop;

FIGURE 7 is a similar view of a modification of FIGURE 6;

FIGURE 8 is a sectional detail of a further embodiment in the closed position; and FIGURE 9 is a view of an embodiment functioning in a manner similar to the embodiment of FIGURE 7;

FIGURE 10 is a side elevation partly cut away of an embodiment of the invention;

FIGURE 11 is a section on the line A—A of FIGURE 10.

FIGURE 12 is a side elevation partly cut away of a pair of made-up loop seals;

Figures 1A, 1B, 1C:
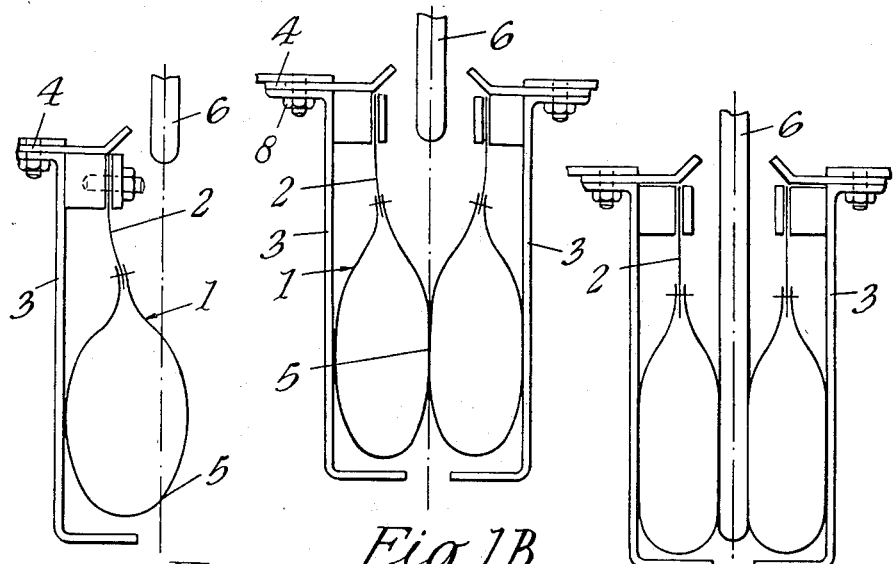
FIGURE 1A is a sectional detail of an embodiment of the invention employing a single loop.
FIGURES 1B and 1C are similar details of a further embodiment in the open and closed position respectively.

In FIGURE 1A is shown a strip 1 of flexible spring tempered sheet material bent so that its two side edges are brought together to form a loop 5 which is secured to one side edge of a further strip 2 of similar material the other edge of which is secured to an external L-shaped extension 3 of the frame 4 of the flue of a damper. The loop 5 is contained within the extension 3. A moving member or slide 6 operating on the chain line shown will elastically compress the loop against the member 3 to form a seal for the part of the flue on the left hand side of the slide 6.

FIGURES 1B and 1C show a further embodiment. Two loops according to FIGURE 1A are combined to form a gland. The loops 5 are retained in L-shaped extension 3 attached to the frame 4.

In the deformed position shown in FIGURE 1C the loops 5 which were in contact (FIGURE 1B) are separated and elastically compressed into a somewhat rectangular shape thus sealing the flue on both side of the slide 6.

Figures 2, 3:
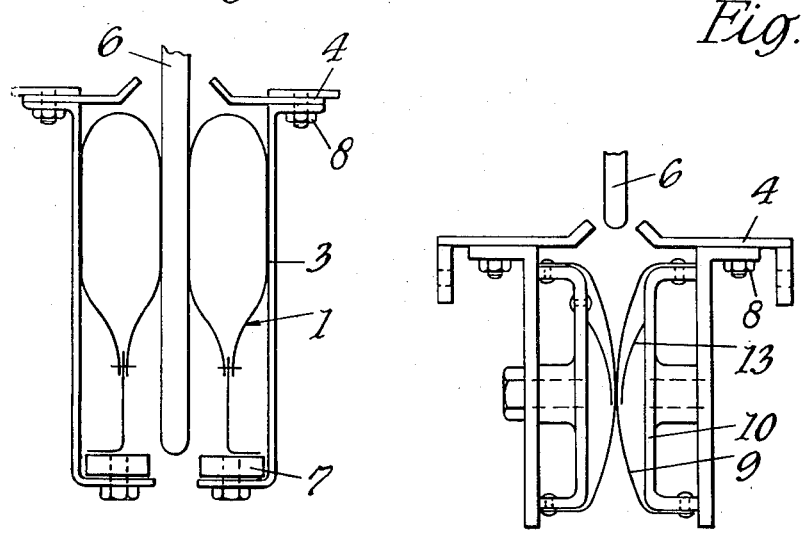
FIGURE 2 is a similar detail of a further embodiment in the closed position.
FIGURE 3 is a similar detail of a further embodiment in the open position.

FIGURE 2 shows an alternative arrangement of the seal. The seal housing fixture 8 and the fixture of the loop springs 7 are separate, and the seal loops turned toward the flue, thus facilitating access to the seal from outside while the flue is not in use.

In FIGURE 3 the moving member 6 in the form of a guillotine type rigid slide shown moving toward its closed position in which it will penetrate between the curved portions of two shallow D-shaped loops 9 of thin spring tempered steel forming a seal; the ends of the springs being secured to plane faced rigid members 10 which are fixed to the frame 4 of the damper. The curved portions of the D-shaped loops are supported by interior stiffening springs 13. The D-shaped loops are flattened in tension to give a seal. The member 6 could be alternatively operated from below as shown dotted.

FIGURE 4 shows a seal otherwise similar to FIGURE 2 in which the loops 1 are internally reinforced against undue compressional stresses by cross fins 11 so that a sliding member can enter the seal head-on without undue distortion of the seal loops. This reinforcemen can also consist of a rigid support member.

FIGURE 5 shows details of a loop to which have been added internal springs 13 increasing the outward extension and sealing pressure of the loop. These internal springs are again suitably composed of comparatively narrow strips placed at a suitable pitch, thus maintaining lateral flexibility of the loop.

In FIGURE 6 the loop 5 is secured on the edge of the moving member or slide 6 and abuts against a C-shaped piece 14 which will be secured to the frame 4.

The loop is shown in the closed position in which it is being pushed against the flanges of the channel 14 and thus deformed in its cross sectional shape.

In the case where a slide 6 fitted as shown in FIGURE 6 is to be withdrawn through a slot 15 in the side of a frame the seal in the open position of the damper will take the form shown in FIGURE 7.

A slide could thus have a loop as shown in FIGURE 6 on both its edges which are transverse to the direction of movement to give a seal at both of these edges in the closed position while in the open position the flue would continue to be sealed against outside air in the manner shown in FIGURE 7.

In FIGURE 8 an elliptical seal of flexible spring-tempered sheet is contained within a C-shaped part 16 and is deformed in the closed position by the leading edge of the slide 6 as shown.

In FIGURE 9 two D-shaped loops 9 are shown attached one on each side of the slide 6, and are pushed into a channel or throat in the frame member to effect compression of the loops.

FIGURES 10 and 11 show two straight gland assemblies 17 being assembled to form a 90° corner joint 18 of a perimetrical gland for a rectangular duct.

The loops 5 will be fitted together end to end in overlapping positions while at the corners they are shaped to interfit with overlap.

It will be appreciated that along the sides of the seal there will be a series of adjoining loop sections in overlapping or butting or similar relationship, forming a virtually continuous sealing line. If the loops are supplied with air or protective gas at a higher pressure than that of the gas in the flue; this will prevent escape of flue gas through the joints of the overlaps.

If looped spring seals, according to the invention, are applied to the moving member of an isolating valve or damper, e.g. according to FIGURES 6 and 7, it is convenient to construct the seals as integrated sealing components. They could then combine those features of the invention as are required for their purpose and be carried on their own base plate, as shown in FIGURES 12, 13 and 14, in an example using air for preventing even residual gas leakage.

The advantage is that they can be fitted or replaced very easily, without the residual leakage though the loop joint being further increased by fitting clearances.

Figure 13:
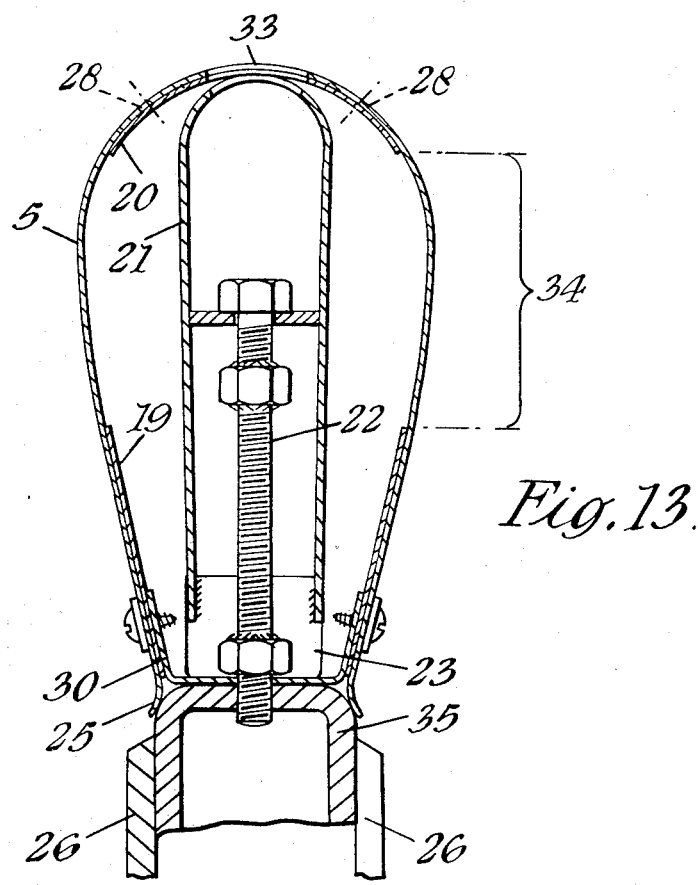
FIGURE 13 is a section on the line XII—XII of FIGURE 12.
Figure 14:
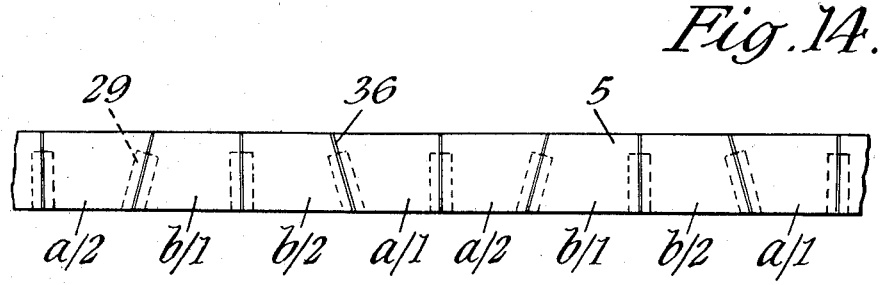
FIGURE 14 is a plan view looking down on a series of pairs of loop seals as in FIGURES 12 and 13.

In FIGURE 13, the moving member contains fixed to its plate 26 air circuit tubes 35 to which the base plate 30 of the sealing component is fixed by the screw 22, which is accessible through a hole 33 in the tip of the loop 5.

The basic margins 25 of the loop 5 form springs which seal the joint between the base plate 30 of the sealing component and the face of the air tube 35.

The relatively thin flexible material of the loop is reinforced by further layers of reinforcing sheet 19 near its root, and a further sheet 20 at the loop tip leaving a highly flexible sealing margin of single layer material 34 between them.

The loop is protected against undue compression when pushing through flue dust layers or other obstacles by the support member 21. In this case it leaves a gap at the bottom 23 to permit the sealing air to pass into the loop and beyond into the actual sealing area.

The air tubes of the moving member 35 are provided with feeding holes 24 (FIGURE 12) to supply this air.

The reinforcing strips 19 and 20 are fixed over their whole area by spot welding or rivetting 27.

In order to ease the fitting of the loops they are produced with a gap 36 between the sections; this, in conjunction with holes 28 perforating the loop tip, provides sealing air or sealing gas into the actual sealing area.

The gaps 36 are closed up to the sealing margin by butt strips 29 overlapping with both adjoining loops.

To further ease the installation and replacement of the self-contained sealing components, two loops are always arranged as a pair sloping at their outer ends as shown in FIGURE 14 (which constitutes a key drawing for the arrangement), the upward sloping sections a/1 and a/2 can be lifted off individually. They will, however, have to be removed to permit removal of one of the b sections.

Various modifications may be made within the scope of the invention.

I claim:
1. Sealing means for dampers comprising at least one strip of flexible spring-tempered sheet metal having a bend of at least 180° to form a transversely resilient closed loop; said loop being secured at its adjacent edges and being elastically deformable in its cross-sectional shape by pressure against the areas intermediate said adjacent edges and the crown of said loop opposite said edges whereby in use two resiliently deformed flat portions of the resilient loop are presented in abutment against two seating faces to effect a resilient self-adjusting seal between a moving member and a fixed frame with which the moving member cooperates.

2. Sealing means as claimed in claim 1 in which said loop is flexible all round the circumference of its cross-section.

3. Sealing means as claimed in claim 1 in which said loop is closed by a rigid member over part of the circumference of its cross-section.

4. Sealing means as claimed in claim 1, in combination with a damper of the sliding type.

5. Sealing means as claimed in claim 4 in which said loop is connected with the sliding member and is engaged by a channel in said frame member having an opening smaller than the loop diameter to effect compression of said loop.

6. Sealing means as claimed in claim 4 in which said loop is connected to said frame member.

7. Sealing means as claimed in claim 6 in which said sliding member is arranged to pass between and compress a pair of loops connected to said frame member.

8. Sealing means as claimed in claim 7 in which said pair of loops seat against each other to form a seal in the open position of the damper.

9. Sealing means as claimed in claim 1 in which the interior of said loop is supplied with a gas under pressure.

10. Sealing means as claimed in claim 1 in which said loop is stiffened by interior springs.

11. Sealing means as claimed in claim 7 in which said loops are mounted so as to be accessible from the outside of the flue.

12. Sealing means as claimed in claim 4 which has a plurality of loops, each having their adjacent edges secured to a base plate which in turn is removably connected to the leading edge of said sliding damper, said loops having sealing margins which overlap the base plate damper interface and insures a sealing continuity.

References Cited

UNITED STATES PATENTS

| | | | |
|---|---|---|---|
| 1,476,344 | 12/1923 | McGee | 251—172 X |
| 2,489,915 | 11/1949 | Loewenheim | 126—285 |
| 2,673,708 | 3/1954 | Danks | 251—173 |
| 2,996,063 | 8/1961 | Lowe | 126—285 |
| 3,084,715 | 4/1963 | Scharres | 126—285 X |
| 3,159,377 | 12/1964 | Samour | 251—175 |
| 3,228,389 | 1/1966 | Lowe | 251—172 X |
| 3,377,047 | 4/1968 | Schöll | 251—176 X |

CLARENCE R. GORDON, Primary Examiner

U.S. Cl. X.R.

251—174, 175, 176, 326, 327, 328; 126—785